United States Patent [19]

Hoch

[11] 3,821,307
[45] June 28, 1974

[54] BICYCLIC KETONES HAVING BIOLOGICAL ACTIVITY

[75] Inventor: Paul E. Hoch, Moraga, Calif.

[73] Assignee: Hooker Chemical Corporation, Niagara Falls, N.Y.

[22] Filed: Apr. 30, 1971

[21] Appl. No.: 139,254

Related U.S. Application Data

[60] This Application is a Div. of Ser. No. 714,058, Mar. 18, 1969, Pat. No. 3,661,998, which is a continuation-in-part of application Ser. No. 413,952, Nov. 24, 1964, abandoned.

[52] U.S. Cl. ......... 260/586 R, 260/590, 260/617 R, 260/618 D, 260/618 R, 260/346.1 R, 260/347.2, 260/347.8, 424/331, 424/332
[51] Int. Cl. ..................... C07c 49/27, C07c 49/80
[58] Field of Search ............................ 260/587, 590

[56] References Cited
UNITED STATES PATENTS

| | | | |
|---|---|---|---|
| 1,399,082 | 12/1921 | Rupe | 260/587 |
| 2,056,441 | 10/1936 | Yasuhiko et al. | 260/587 |
| 2,657,164 | 10/1953 | Buntin | 260/587 |
| 2,658,079 | 11/1953 | Nishimitsu et al. | 260/587 |

*Primary Examiner*—Leon Zitver
*Assistant Examiner*—Norman Morgenstern
*Attorney, Agent, or Firm*—Peter F. Casella; Donald C. Studley; William J. Crossetta, Jr.

[57] ABSTRACT

Bicyclic ketones of the formula

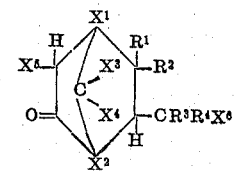

wherein $R^1$, $R^2$, $R^3$, $R^4$, $X^1$, $X^2$, $X^3$, $X^4$ and $X^5$ are certain substituents selected from hydrogen, halogen, alkyl, alkenyl, halogenated alkyl, halogenated alkenyl, alkoxy, hydrocarbyl, halogen-substituted hydrocarbyl, carboxy, hydroxy-substituted alkyl, alkoxy-substituted alkyl, and hydroxy-substituted alkoxyalkyl, with at least two of $X^1$, $X^2$, $X^3$ and $X^4$ being halogen, and $X^6$ is halogen. The bicyclic ketones are made by treating a corresponding yricyclic hemiketal with phosphorus halide and hydrolyzing. The bicyclic ketones are useful as chemical intermediates and as insecticides.

8 Claims, No Drawings

BICYCLIC KETONES HAVING BIOLOGICAL ACTIVITY

This application is a division of U.S. Pat. application Ser. No. 714,058, filed Mar. 18, 1968, now U.S. Pat. No. 3,661,998, issued May 9, 1972, which is a continuation-in-part of U.S. Pat. application Ser. No. 413,952, filed Nov. 24, 1964, now abandoned.

This invention relates to new compositions of matter and to process for their preparation. More specifically, the invention relates to novel cyclic ketone compositions, a novel reaction for the production of such compounds, and methods for utilizing the compositions in the control of pests, and as chemical intermediates.

In accordance with this invention, there are provided compounds having the formula:

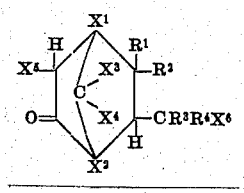

wherein $X^1$ and $X^2$ are independently selected from the group consisting of hydrogen, halogen, alkyl, alkenyl, halogenated alkyl and halogenated alkenyl;

$X^3$ and $X^4$ are independently selected from the group consisting of hydrogen, halogen, alkoxy, alkyl, alkenyl, halogenated alkyl, and halogenated alkenyl, at least two of $X^1$, $X^2$, $X^3$ and $X^4$ are being halogen;

$X^5$ is selected from the group consisting of hydrogen, halogen and alkoxy;

$X^6$ is halogen;

$R^1$ and $R^2$ are independently selected from the group consisting of hydrogen, hydrocarbyl, halogen-substituted hydrocarbyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ can join to form a cycloalkyl group.

The hydrocarbyl radicals are monovalent radicals derivable from a hydrocarbon by the removal of one hydrogen atom. Typical hydrocarbyl radicals are alkyl, alkenyl, aryl, cycloalkyl and the like, defined with greater particularity herein.

Illustrative examples of the alkyl substituents, which usually contain from 1 to about 18 carbon atoms, and preferably lower alkyl, such as from 1 to about 6 carbon atoms, are methyl, ethyl, propyl, isopropyl, butyl, isobutyl, amyl, hexyl, cyclohexyl, heptyl, octyl, nonyl, dodecyl, pentadecyl, stearyl, octadecyl, and the like, said alkyl group being a monovalent radical derivable from an aliphatic hydrocarbon by the removal of one hydrogen atom. The alkylene radicals can be similarly described, except that they are divalent radicals derivable from an aliphatic hydrocarbon by the removal of two hydrogen atoms, such as methylene, ethylene, and the like. The alkyl radical can be substituted by halogen, such as chlorine, bromine, or fluorine, as in chloromethyl, dichloromethyl, trichloromethyl, trifluoromethyl, bromoethyl, chloroethyl, fluoropropyl, hexachloroisopropyl, chlorobutyl, bromobutyl, chlorocyclohexyl, chloropropyl, bromooctyl, chlorooctyl, chlorodecyl, chlorodedecyl, bromododecyl, bromopentadecyl, and the like.

Among the alkenyl substituents which usually contain from 1 to about 18 carbon atoms, and preferably lower alkenyl, such as from 1 to about 6 carbon atoms, are vinyl, allyl, butenyl, hexenyl, octenyl, dodecenyl, and the like, said alkenyl group being a radical derivable from an alkene by the removal of one hydrogen atom. The alkenyl radical can be substituted by halogen, such as chlorine, bromine or fluorine as in trichlorovinyl, 2-chloroallyl, 2,3-difluorobutenyl, 2,3-dichlorododecenyl, 2-bromoallyl, and the like.

Typical aryl substituents including aralkyl and alkaryl groups, which usually contain from 6 to about 18 carbon atoms, and preferably from 6 to about 10 carbon atoms, are phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as chlorine, bromine, and fluorine, as in p-chlorophenyl, p-bromophenyl, p-fluorophenyl, and the like.

Typical cycloalkyl substituents, which usually contain from three to about twelve carbon atoms, are cyclohexyl, cyclopropyl, cyclopentyl, cycloheptyl, cyclooctyl, and the like, said cycloalkyl group being a monovalent radical derivable from an alicyclic hydrocarbon by the removal of one hydrogen atom. The cycloalkyl radicals can be substituted by halogen, e.g., chlorine, bromine and fluorine as in chlorocyclohoxyl, bromocyclopentyl, fluorocyclohexyl, and the like.

The substituting halogen atoms which are useful include chlorine, bromine, and fluorine. The halogenated elkyl, aryl, cycloalkyl or alkenyl radicals can bear from one halogen up to a number, corresponding to perhalogenation, i.e., all hydrogens replaced with halogen atoms.

The preferred compounds of the invention are those wherein the halogen substituents are chlorine or bromine, and in which $R^1$, $R^3$ and $R^4$ are hydrogen, and $R^2$ is selected from hydrogen, and chloro-substituted lower alkyl. Even more preferred are such compounds wherein the halogen is chlorine.

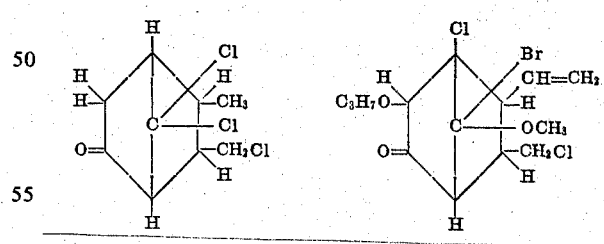

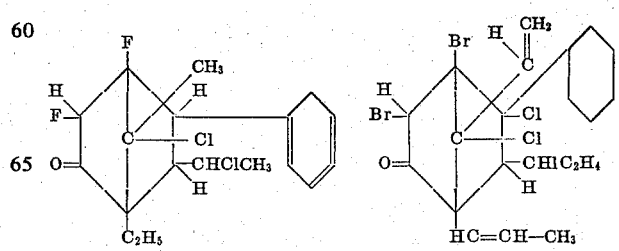

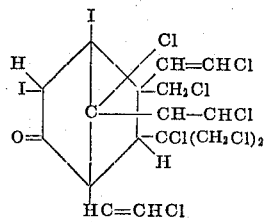
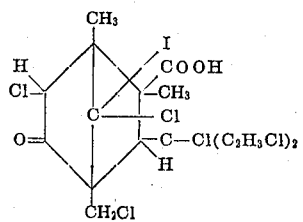
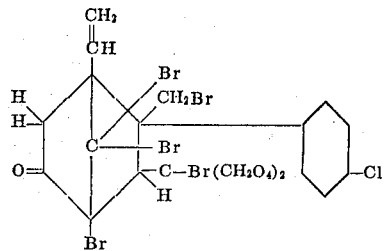
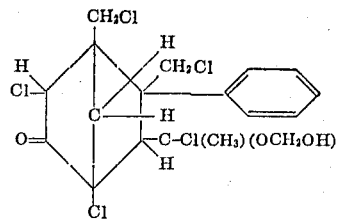
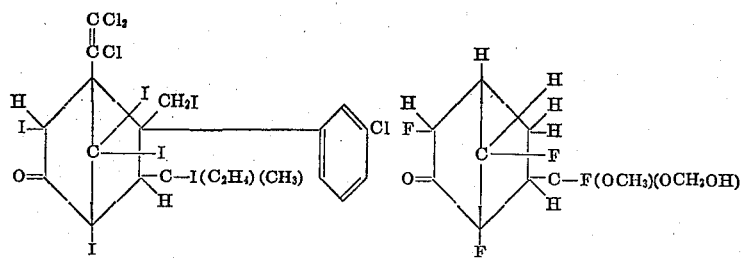
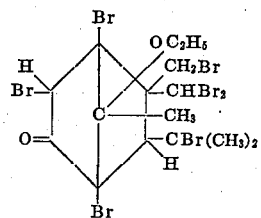
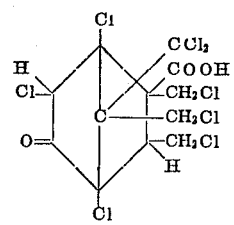
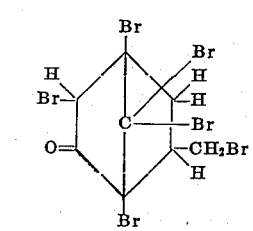
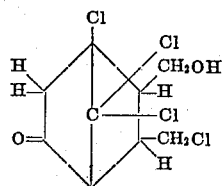
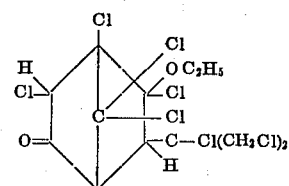
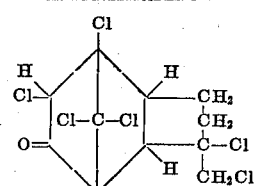
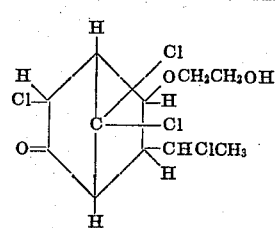
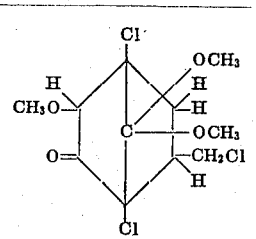
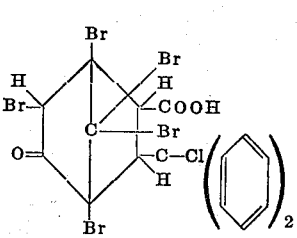
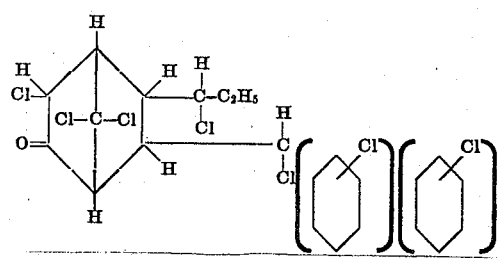
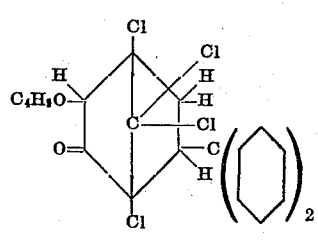

The compounds of the invention are prepared in a series of reactions starting with selected bicyclic alcohols. These alcohols are prepared by reacting the appropriate substituted cyclopentadiene and unsaturated alcohol as represented by the following equation.

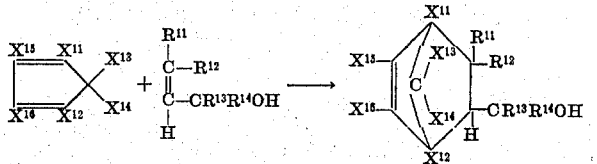

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ and $X^{16}$ are independently selected from the group consisting of hydrogen, halogen and alkoxy, at least one of $X^{15}$ and $X^{16}$ being halogen;

$R^{11}$ and $R^{12}$ are independently selected from the group consisting of hydrogen, hydrocarbyl, and hydroxy-substituted alkyl;

$R^{13}$ and $R^{14}$ are independently selected from the group consisting of hydrogen, hydrocarbyl, hydroxy-substituted alkyl, alkoxy-substituted alkyl and hydroxy-substituted alkoxy alkyl, and $R^{11}$ and $R^{13}$ can join to form a cycloalkyl group, generally of 5 to 6 carbon atoms.

The halogen, hydrocarbyl, alkyl and alkenyl radicals are the same as those described hereinbefore. The preparation of such alcohols is described in detail in U.S. Pat. No. 3,007,958. Suitable cyclopentadienes include, for example, hexachlorocyclopentadiene; 1,2,3,-4,5-pentachlorocyclopentadiene; 1,2,4,5,5-pentachlorocyclopentadiene; tetrachlorocyclopentadiene; 1,2,3,4-tetrachloro-5,5-dibromocyclopentadiene; 1,2,-3,4-tetrachloro-5,5-difluorocyclopentadiene; 1,2,3,4-tetrachloro-5,5-dimethoxycyclopentadiene; 1,3,4-trichloro-2,5,5-trimethoxycyclopentadiene; trichloromethylpentachlorocyclopentadiene; trichlorovinylpentachlorocyclopentadiene; butenylpentachlorocyclopentadiene; and the like. The usual halogen substituents are chlorine, fluorine, bromine and mixtures thereof, preferably chlorine. Suitable alcohols are, for example, 2-butenyl alcohol; cinnamyl alcohol; 1-carboxy-3-hydroxy propene-1; 2-butene-1,4-diol; 3-hexene-2,5-diol; 8-hexadecene-7,10-diol; 1,4-cyclohexyl-2-butene 1,4-diol; 3,4-dihydroxy-2 butene; 3-hydroxycyclopentene; 4,3-hydroxycyclohexene-1, and the like. Compounds that are readily convertible to alcohols in the reaction process are also useful, such as 3,4-epoxy-1-butane and 3,4-epoxy-1-hexane.

The preparation of the compounds of the invention is illustrated by the following equations wherein the reaction steps are designated by the letter A through C, but is not intended to be limited thereby.

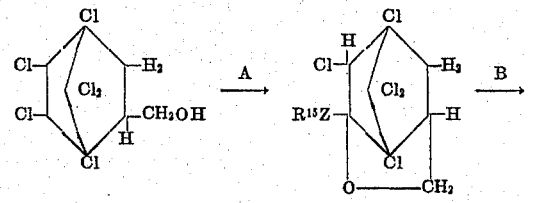

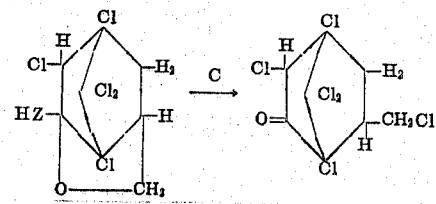

In the reaction designated on the chart by A, the bicyclic alcohol is contacted with a strong base in an alcohol or an aqueous alcoholic medium. The strong base is one that is capable of forming an alkoxide with the alcohol medium, such as an alkali metal hydroxide or an alkali metal itself. Suitable alkali reactants are sodium, potassium, lithium, rubidium, cesium, and the corresponding hydroxides, such as sodium hydroxide and potassium hydroxide, and the like. If desired, the alkoxide reactant can be prepared prior to its addition to the bicyclic alcohol by reacting the alkali compound with the appropriate alcoholic component. Suitable alcohols or like media for use in forming the alkoxide, or as the alcoholic medium for the reaction, are those having the formula $R^{15}ZH$, wherein Z is selected from the group consisting of oxygen and sulfur, and $R^{15}$ is selected from the group consisting of hydrocarbyl, halogen-substituted aryl, hydroxy-substituted hydrocarbyl, mercapto-substituted hydrocarbyl, hydrocarbyloxy-substituted hydrocarbyl and hydrocarbylthio-substituted hydrocarbyl. The hydrocarbyl, and halogen-substituted aryl groups are the same as those described hereinbefore in connection with $R^1$, $R^2$, $R^3$, $R^4$. As indicated herein, the alcoholic component can be a monohydric alcohol, such as methanol, a polyhydric alcohol, such as ethylene glycol and glycerol, a mercaptan, such as ethyl mercaptan, a polythiol, such as β-mercapto-orthanol, or can bear a combination of hydroxyl and mercapto groups. The alkali reactant is employed in an amount sufficient to provide at least three moles of alkali or alkoxide per mole of bicyclic alcohol, and preferably about four moles per mole are employed. A greater amount can be employed, if desired, for example up to ten moles per mole. A minimum of at least three moles of alcoholic component is employed per mole of bicyclic alcohol, but more usually a large excess, for example, up to 100 moles per mole, is employed to supply a solvent for the reaction. Other solvents can also be employed, such as inert diluents that do not participate in the reaction, but which are solvents for the bicyclic alcohol. Such diluents are dimethylsulfoxide, tertiary amines, such as N-methyl morpholine, and the like.

In carrying out Reaction A, the reaction mixture is generally heated to about the reflux temperature, so that the temperature is somewhat dependent on the boiling point of the alcoholic medium. However, the reaction temperature is generally in the range of about 25° to 150° C. The reaction time can be varied over a considerable extent, but will generally be in the range of one to ten hours. At the completion of the reaction, the reaction mixture is acidified with a mineral acid, such as hydrochloric acid, and can be diluted with water, or if desired, these steps can be reversed. The reaction mixture is ordinarily filtered to remove inorganic salts, and any excess solvent can be removed from the reaction mixture by distillation. The product of the reaction can be purified by crystallization, washing, and drying or other suitable means.

Reaction B is generally carried out by suspending the tricyclic ketal produce to Reaction A in a solution of a mineral acid, such as sulfuric acid, phosphoric acid, hydrogen bromide, hydrogen iodide, hydrochloric acid (in a misible solvent such as acetic acid); metal chlorides, such as aluminum chloride, zinc chloride, and the like. The concentrated acid solution are preferably employed. At least about two moles of acid are used per mole of tricyclic ketal, but more usually a large excess, for example, up to 100 moles per mole is employed to provide a solvent for the reaction. An inert solvent or co-solvent can also be employed. The reaction temperature is generally in the range of 50 to 100 degrees centigrade, or up to the reflux temperature of the reaction mixture. The reaction is facilitated by agitation and the reaction time can vary from a few minutes up to 5 hours, but preferably is in the range of 10 to 60 minutes, more preferably 10 to 30 minutes. After the completion of the reaction, the reaction mixture is cooled and filtered to recover the product. The resulting product can be purified by recrystallization, washing, drying, and other suitable methods.

In Reaction B, if the tricyclic ketal starting material has an $R^{12}$ substituent that is hydroxyl-substituted (as produced in a series of reactions beginning with a bicyclic diol), somewhat milder reaction conditions are employed to inhibit formation of a tricyclic ketone rather than the indicated product of Reaction B. Under these circumstances, the reaction temperature is maintained in the range of 50° to 100° C. for 10 to 30 minutes, and 10 to 15 minutes at 80° to 100° C.

The process of the invention, denoted on the chart as Reaction C, is generally conducted by reacting the tricyclic hemi-ketal product of Reaction B with a phosphorous halide, such as phosphorous pentachloride or phosphorous pentabromide. At least about one mole of phosphorus halide is employed per mole of hemi-ketal, but an excess can be employed if desired, for example, up to ten moles per mole. A solvent can be employed for the process. The hemi-ketal compound starting material is mixed with the phosphorus pentahalide and heated slowly with agitation. The reaction is exothermic and evolves hydrogen halide gas. After the initial mixing step, the reaction mixture is ordinarily heated at the reflux temperature or generally in the range of 100° to 150° C. for a period of about 1 to 5 hours. The reaction product is hydrolyzed by contacting with at least one mole of water per mole of product, although a large excess of water is generally employed. Thereafter the product can be purified by recrystallization, washing, drying, and other suitable methods.

The bicyclic ketone product of the invention is capable of undergoing a number of interesting reactions. The ketone of the invention can be reacted with an alkoxide of the type described with respect to Reaction A to form the ketal product which bears a $R^{15}Z$ radical, i.e., of the type produced in Reaction A. Moreover, the bicyclic ketone of the invention can be reacted with an alkali metal bicarbonate, such as a bicarbonate of sodium, potassium, rubidium or cosium, to form a hemi-ketal product having a hydroxyl radical, i.e., of the type produced in Reaction B. The latter reaction is preferably carried out by contacting a mixture of the bicyclic ketone, the desired alkali metal bicarbonate, water, and an alcohol diluent of the formula $R^{15}ZH$ described hereinbefore. The mixture is heated, preferably at the reflux temperature, although temperatures in the range of 50° to 150°C. can be used. The reaction time can vary from as little as an hour up to 10 to 15 hours. After the completion of the reaction, the alcohol diluent can be removed by distillation, and the product can be purified by phase separation, washing, drying, and other suitable methods.

In another reaction, the bicyclic ketone of the invention is contacted with an alkali metal cyanide, such as a cyanide of sodium, potassium, lithium, rubidium or cesium. At least one mole of cyanide is generally employed per mole of bicyclic ketone, but an excess, up to 10 moles per mole can be employed. The reaction is generally carried out by adding the alkali metal cyanide to a solution of the bicyclic ketone dissolved in an alcohol of the formula $R^{15}ZH$ described hereinbefore. The reaction mixture is heated to an elevated temperature, generally in the range of about 50° to 150° C., and preferably at about the reflux temperature of the mixture for a period of 1 to 10 hours. The resulting reaction product can be acidified with a dilute mineral acid such as sulfuric acid, hydrochloric acid, and the like. The reaction diluent can be removed by distillation and the resulting product can be purified by crystallization, washing, drying, and other suitable methods.

The bicyclic ketone of th invention can also be reacted with compounds such as the alkali metal thiocyanaics, e.g., potassium thiocyanate; and alkali metal azides, e.g., sodium aside, to provide products having the corresponding nucleophilic radicals attached to the bicyclic nucleus. For those reactions, the conditions are similar to those employed with reactants such as the alkali metal cyanides.

The various products of the above-described reactions can be reacted with halogens and halogen halides to produce compounds wherein the hydrocarbyl, e.g., alkyl, cycloalkyl, alkenyl and aryl substituents as represented by $X^{11}$, $X^{12}$, $X^{13}$, $X^{14}$, $R^{11}$, $R^{12}$, $R^{13}$, $R^{14}$ and $R^{15}$ are converted to the corresponding halogen-substituted radicals as represented by $X^1$, $X^2$, $X^3$, $X^4$, $R^1$, $R^2$, $R^3$, $R^4$ and $R^5$, respectively. $R^5$ represents the same radicals as $R^{15}$ and in addition, halogen-substituted alkyl and halogen-substituted cycloalkyl. The resulting halogen-substituted alkyl, alkenyl, cycloalkyl and aryl radicals are as described hereinbefore.

The tricyclic compounds disclosed herein are disclosed and claimed in co-pending U.S. Pat. application Ser. No. 413,947, filed on even date herewith now U.S. Pat. No. 3,346,596.

The following examples illustrate the invention, but are not intended to limit it. All parts are by weight, all analyses are given in percentage by weight, and temperatures are given in degrees centigrade, unless indicated otherwise.

EXAMPLE 1

PREPARATION OF
4-ETHOXY-5,6,7,7,8-PENTACHLORO-3-oxatricyclo-[4.2.1.0$^{4,8}$] NONANE (REACTION A)

A solution of sodium ethoxide was prepared by adding 92 parts of sodium metal to 3,925 parts of absolute ethanol. To this solution was added, with stirring at 74° C., a solution of 331 parts of 1,4,5,6,7,7-hexachloro-2-hydroxymethylbicyclo(2.2.1)-5-heptene in 785 parts of absolute ethanol. Addition was made portionwise over 1 hour. The suspension was stirred at reflux for 2 hours after addition of the reactants was completed. 4,000 parts of water were added to the reaction at completion, the the pH was adjusted with hydrochloric acid to 7.0. The solid that precipitated was collected on a filter, washed several times with water and dried under vacuum at 50° C. overnight to a constant weight of 332 parts. Recrystallization from n-heptane and a treatment with activated charcoal yielded 325 parts of product, having a melting point of 110° to 111.5° C. Product analysis was:

Calculated for $C_{10}H_{11}O_2Cl_5$: Cl, 52.1; C, 35.3; H, 3.24

Found: Cl, 52.0; C, 35.4; H, 3.36

EXAMPLE 2

PREPARATION OF 4-ETHOXY-9-HYDROXYMETHYL-5,6,7,7,8-PENTACHLORO-3-OXATRICYCLO [4.2.1.0$^{4,8}$] NONANE (REACTION A)

A reaction vessel equipped with an agitator and a condenser was charged with 1,177 parts of anhydrous ethanol. To this alcohol was added portionwise 92 parts of sodium metal. The resulting solution was agitated at reflux and a solution of 361 parts of 1,4,5,6,7,7-hexachloro-2,3-di(hydroxymethyl)bicyclo(2.2.1)-5-heptene in 235 parts of absolute ethanol was added portionwise over two hours. After completion of the addition, the suspension was stirred at reflux for 2 hours, then brought to a pH of 7.0 with concentrated hydrochloric acid. The suspension was filtered, and the filtrate was stripped of solvent. The residue was washed with water, filtered, dried, and recrystallized from n-hexane to give 240 parts of crystals, having a melting point of 138.5° to 140° C. Another recrystallization raised the melting point to 140.5° to 141.5° C. The product analyzed as follows:

Calculated for $C_{11}H_{13}Cl_5O_3$: C, 35.67; H, 3.51; Cl, 47.86

Found: C, 35.78; H, 3.54; Cl, 47.78

Calculated hydroxyl no.: 151; found: 149

EXAMPLE 3

PREPARATION OF 9-CHLOROMETHYL-4-ETHOXY-5,6,7,7,8-PENTACHLORO-3-OXATRICYCLO [4.2.1.0$^{4,8}$] NONANE

A mixture of 37 parts of 4-othoxy-9-hydroxymethyl-5,6,7,7,8-pentachloro-3-oxatricyclo]4.2.1.0$^{4,8}$]nonane with phosphorus pentachloride was slowly heated to 45° to 55° C. at which point an exothermic reaction commenced. After 10 minutes, complete solution resulted and the pot temperature had risen to 150° C. with refluxing observed. Heating was continued until hydrogen chloride evolution had virtually ceased, which required six hours. The reaction mixture was cooled and poured into ice. The oily solid product resulting was triturated with water, then taken up in n-hexane. After washing the resulting hexane solution with water, drying over $CaSO_4$, filtering and cooling to −15° C., the hexane solution gave 13.3 parts of solid product having a melting point of 86.5° to 87.5° C. Infrared analysis of the product showed the product was not unsaturated and contained no carbonyl or hydroxyl groups. Chemical analysis of the product showed:

Calculated for $C_{11}H_{12}O_2Cl_6$: Cl, 54.7; C, 33.97; H, 3.11

Found: Cl, 55.1; C, 34.16; H, 2.93

EXAMPLE 4

PREPARATION OF 7,7-DIMETHOXY-4-ETHOXY-5,6,8-TRICHLORO-3-OXATRICYCLO-[4.2.1.0$^{4,8}$]NONANE (REACTION A)

To 118 parts of anhydrous ethanol were added 10.2 parts of metallic sodium. This solution was warmed to reflux with agitation, and a solution of 32.2 parts of 1,4-,5,6-tetrachloro-2-hydroxymethyl-7,7-dimethoxybicyclo(2.2.1)-heptene was added over a period of 0.75 hours. The suspension was stirred for three hours at reflux, then filtered and the solvent was stripped. The residue was treated with excess water, and the resulting suspension was acidified with hydrochloric acid. The resulting oil solidified and was recrystallized from about 96 parts by weight of petroleum ether immersed in a dry ice-acetone cooling bath. The white solid product weighing 24.0 parts had a melting point of 62° to 68° C. and was recrystallized to yield 20.0 parts by weight of product having a melting point of 68.5° to 69.5° C. Analysis of the product showed:

Calculated for $C_{12}H_{17}Cl_3O_4$: C, 44.10; H, 5.24; Cl, 32.3

Found: C, 43.60; H, 5.14; Cl, 32.19

Using the same procedure, the compounds 1,4,5,6-tetrachloro 2-hydroxymethyl-7,7-dibromobicyclo(2.2.1)-5-heptene and 1,4,5,6-tetrachloro-2-hydroxymethyl-7,7-difluorobicyclo(2.2.1)-5-heptene are reacted to produce 7,7-dibromo-4-ethoxy-5,6,8-trichloro-3-oxatricyclo[4.2.1.0$^{4,8}$]nonane and 7,7-difluoro-4-ethoxy-5,6,8-trichloro-3-oxatricyclo[4.2.1.0$^{4,8}$]nonane, respectively.

EXAMPLE 5

PREPARATION OF 4-HYDROXY-5,6,7,7,8-PENTACHLORO-3-OXA-TRICYCLO-[4.2.1.0$^{4,8}$]NONANE (REACTION B)

A suspension of 30 parts of 4-ethoxy-5,6,7,7,8-pentachloro-3-oxatricyclo[4.2.1.0$^{4,8}$]nonane in 92 parts by weight of concentrated sulfuric acid was warmed to 88° to 100° C. with stirring and was held for 0.75 hour. The hot acid solution was poured into 700 parts of ice and water, and the resulting suspension was warmed to 80° C., then cooled and filtered. Then 13 parts of solid product were recrystallized from benzene several times to yield 7 parts of white crystals having a melting point of 231° to 232° C. Infrared analysis of the product indicated the presence of hydroxyl group, absence of carbonyl group. Elemental analysis showed.

Calculated for $C_8H_7Cl_5O_2$: C, 30.75; H, 2.24; Cl, 56.70

Found: C, 30.96; H, 2.20; Cl, 56.90

EXAMPLE 6

PREPARATION OF 4-HYDROXY-9-HYDROXYMETHYL-5,6,7,7,8-PENTACHOLORO-3-OXATRICYCLO[4.2.1.0$^{4,8}$-]NONANE (REACTION B)

A suspension of 221 parts by weight of concentrated sulfuric acid and 24 parts of 4-ethoxy-9-hydroxymethyl-5,6,7,7,8-pentachloro-3-oxatricyclo[4.2.1.0$^{4,8}$]nonane with concentrated sulfuric acid was stirred with heating to 90° to 92° C. and held at this temperature for eight minutes. The resulting solution was poured into ice and the solid collected on a filter.

After a thorough washing with water, 15 parts of solid product ware recrystallized three times from methanol and water to yield 10.8 parts of solid product having a melting point of 236° to 238° C. Infrared analysis showed the presence of the carbonyl and hydroxyl broups. Elemental analysis of the product showed:

Calculated for $C_9H_9Cl_5O_3$: C, 1.58; H, 2.63; Cl, 52.2

Found: C, 31.81; H, 2.61; Cl, 52.0

EXAMPLE 7

PREPARATION OF 9-CHLOROMETHYL-4-HYDROXY-5,6,7,7,8-PENTACHLORO-1-OXATRICYCLO [4.2.1.0$^{4,8}$]NONANE (REACTION B)

25 parts of 4-ethoxy-9-chloromethyl-5,6,7,7,8-pentachloro-3-oxatricyclo[4.2.1.0$^{4,8}$]nonane were added to 110 parts by weight of concentrated sulfuric acid over a period of 15 minutes while stirring the mixture. The resulting suspension was heated to 94° C. and held at that temperature for 20 minutes, and was then cooled by pouring onto ice. 23 parts of a white solid product were isolated from the reaction mixture. The product was recrystallized from benzene and 17 parts of product were recovered having a melting point of 144.5° to 146° C. Example analysis of the compound gave the following results:

Calculated for $C_9H_8Cl_6O_2$: C, 29.95; H, 2.23; Cl, 58.94

Found: C, 30.18; H, 2.23; Cl, 58.5

EXAMPLE 8

PREPARATION OF 2-KETO-6-CHLOROMETHYL-1,3,4,7,7-PENTA-CHLOROBICYCLO-(2.2.1) HEPTANE (REACTION C)

A mixture of 187.4 parts of 4-hydroxy-5,6,7,7,8-pentachloro-3-oxatricyclo[4.2.1.0$^{4,8}$]nonane and 146 parts of phosphorus pentachloride was carefully warmed with agitation. At 50° C., an exothermic reaction took place with vigorous evolution of hydrogen chloride. The pale yellow, resulting solution was stirred at reflux (118–120° C.) for 2 hours, then poured into crushed ice. The white solid obtained was washed several times with water and recrystallized from hexane to yield 110 parts of product having a melting point of 69.5° to 71.5° C. Analysis of the product gave the following results.

Calculated for $C_8H_6Cl_6O$ : C, 29.05; H, 1.83; Cl, 64.3

Found: C, 29.23; H, 1.97; Cl, 63.80

EXAMPLE 9

PREPARATION OF 2-KETO-5,6-BIS(CHLOROMETHYL)-1,3,4,7,7-PENTACHLOROBICYCLO(2.2.1)HEPTANE (REACTION C)

A mixture of 100 parts of 9-chloromethyl-4-hydroxy-5,6,7,7,8-pentachloro-3-oxatricycle[4.2.1.0$^{4,8}$]nonane and 74 parts of phosphorus pentachloride was heated slowly to the reflux temperature. An exothermic reaction took place, accompanied by evolution of hydrogen chloride. The reaction mixture was refluxed at 136° C. for 1.5 hours. The resulting reaction product was poured into water and washed thoroughly and then extracted with hexane. The reaction product was dried in contact with magnesium sulfate and then the hexane solvent was distilled off. The product distilled at a temperature of 140° to 144° C. and 1 mm. mercury. Infrared analysis of the product indicated the presence of the carbonyl group. Chemical analysis gave the following results:

Calculated for $C_9H_7Cl_7O$: C, 28.57; H, 1.60; Cl, 65.6

Found: C, 28.32; H, 1.66; Cl, 68.2

Additional compounds of the invention are readily produced using the method of Example 9 with the following reactants to give the indicated products.

| EXAMPLE NO. | HEMI-KETAL REACTANT | PHOSPHORUS HALIDE | PRODUCT |
|---|---|---|---|
| 10 | 9-chloromethyl-4-hydroxy-5,6,7,7,8-pentachloro-3-oxa-tricyclo-[4.2.1.0$^{4,8}$]nonane | PBr$_5$ | 2-keto-5,6-bis(bromomethyl)-1,3,4,7,7-pentachloro-bicyclo-(2.2.1)heptane |
| 11 | 9-chloromethyl-4-hydroxy-5,6,8-trichloro-7,7-dibromo-3-oxatricyclo [4.2.1.0$^{4,8}$]nonane | PCl$_5$ | 2-keto-5,6-bis(chloromethyl)-1,3,4-trichloro-7,7-dibromo-bicyclo-(2.2.1)heptane |
| 12 | 9-hydroxymethyl-4-hydroxy-5,6,8-trichloro-7,7-difluoro-3-oxatricyclo [4.2.1.0$^{4,8}$]nonane | PCl$_5$ | 2-keto-5,6-bis(chloromethyl)-1,3,4-trichloro-7,7-difluoro-bicyclo-(2.2.1)heptane |

EXAMPLE 13

PREPARATION OF 4-METHOXY-5,6,7,7,8-PENTACHLORO-3-OXATRICYCLO [4.2.1.0$^{4,8}$]NONANE

Over a period of a few minutes, 100 parts of 2-keto-6-chloromethyl-1,3,4,7,7-pentachlorobicyclo(2.2.1-)heptane were added to 1,570 parts by weight of a solution prepared by adding 25 parts of sodium to methyl alcohol at reflux. The resulting dark suspension was refluxed for 12 hours. Then the excess methanol was distilled from the product under vacuum, and the residue was acidified and filtered. The filter cake was washed with water and 60 parts of solid product were recovered and recrystallized from heptane to provide a product having a melting point of 82° to 85° C. The melting point indicated the product to be the same as that produced using the procedure of Example 1 with metahnol as the solvent. The product was also analysed by infrared analysis, and the resulting spectrum was the same as that of the product produced using the procedure of Example 1 with methanol as the solvent.

EXAMPLE 14

PREPARATION OF 4-HYDROXY-5,6,7,7,8-PENTACHLORO-3-OXATRICYCLO-[4.2.1.0$^{4,8}$]NONANE

To a mixture of 84 parts of sodium bicarbonate, 500 parts by weight of water and 3,925 parts by weight of ethyl alcohol were added 330 parts of 2-keto-6-chloromethyl-1,3,4,7,7-pentachlorobicyclo(2.2.1)-heptane. The mixture was refluxed for 10 hours and then evaporated on a steam cone. Excess water was added to the product, and an oil formed. The oil was treated with hexane. About 25 parts of product that was insuluble in hexane was subjected to infrared analysis and found to have a spectrum identical to that produced in Example 5.

EXAMPLE 15

PREPARATION OF 4-CYANO-5,6,7,7,8-PENTACHLORO-3-OXATRICYCLO-[4.2.1.0$^{4,8}$]NONANE

A solution containing 132 parts of 2-keto-5,6-bis(chloromethyl)-1,3,4,7,7-pentachlorobicyclo(2.2.1-)heptane in 785 parts by weight of ethanol and 30 parts by weight of water was treated with 52 parJs of potassium cyanide. The solution was stirred at reflux for 2.0 hours. The resulting dark suspension was acidified with dilute sulfuric acid and then evaporated to near dryness. The residue was poured into water and the brown solid collected on a filter. The solid was dissolved in hexane, dried over magnesium sulfate (anhydrous), and filtered. The excess hexane was removed, and crystals separated upon chilling the solution. 60 parts of product were recovered having a melting point of 226° to 231° C. Recrystallization raised the melting point fo 235° to 236° C. Elemental analysis of the product gave the following results:

Calculated for $C_9H_6ONCl_5$: C, 33.63; H, 1.88; N, 4.36; Cl, 55.16
Found: C, 33.7; H, 2.02; N, 4.28; Cl, 54.98

EXAMPLES 16 to 17

Aqueous dispersions of certain of the compounds of the invention were prepared. These dispersions at the concentration of 1% were sprayed onto houseflies (musca domestica) and the number of prostrate flies was counted at 2 and 24 hours (considered dead if prostrate at 24 hours).

| EXAMPLE NO. | COMPOUND | % PROSTRATE AT 2 HOURS | % DEAD AT 24 HOURS |
|---|---|---|---|
| 16 | 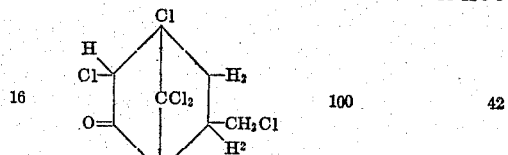 | 100 | 42 |
| 17 | 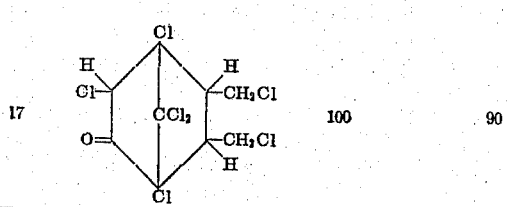 | 100 | 90 |

In the foregoing examples, the components have been named in accordance with the system of nomenclature employed by *Chemical Abstracts*, and with the provision that the compounds have the following structural formula:

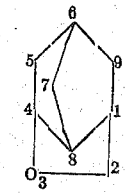

wherein the numerals indicate the position of substituents attached to the tricyclic nucleus. Thus, the ompound prepared in Example 2 has been named 4-ethoxy-9-hydroxymethyl-5,6,7,7,8-pentachloro-3-oxatricyclo [4.2.1.0$^{4,8}$]nonane. Attachment of the oxygen to a different position on the initial bicyclic structure to provide the following structural fomula:

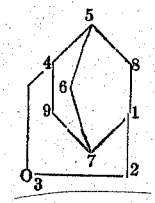

requires renumbering some of the positions of the tricyclic structure, as indicated by the numerals. Under these circumstances, the compound produced in Example 2 is named 4-ethoxy-8-hydroxymethyl-5,6,6,7,-pentachloro-3-oxatricyclo [3.2.1$^{4,7}$]nonane.

The compounds of the invention are useful pesticides, particularly exhibiting activity in controlling invertebrate animal pests, as shown in the foregoing examples. Various effective amounts of the compounds of this invention can be utilized, and the application rates will often be dependent on the particular circumstances. For example, the purified or crude products be combined with other biocides or pesticides, including insecticides, such as DDT, methoxychlor, lindene, aldrin, endrin, DDD, BHC, parathion, malathion, methyl parathion, lead arsenate, and calcium arsenate; miticides such as bis(pentachlorocyclopentadienyl) chlorinated arylsulfonates, chlorinated diarylsulfones and the like, fungicides such as sulfur, dithiocarbamates and N-trichloromethylthio-4-cyclohexene-1,2-dicarboximide to list but a few. Other insecticides with which the compounds of the invention can be employed are those listed by Kenaga, Bull. Ent. Soc. America, 9, 69 ff (1963).

It may also be desirable to combine the insecticidal products of this invention with a class of potentiators or synergists known in the insecticidal art as "knockdown agents." Among the large number of synergists and "knockdown agents" which can be used for this purpose are the organic thiocyanates and others listed by Kenaga (loc.cit., pg. 69,70,92). Other adjuvants useful with the compounds of the invention include odorants, colorants, stabilizers, and extending agents (vapor pressure depressants and nonvolatile solvent substances such as chlorinated waxes, resins, and the like).

Another advantage of the inventive compositions is that they may readily be formulated as solids or liquids using solid or liquid solvent vehicles, carriers, or extenders. Suitable diluents are solids or liquids of an inert nature. Illustrative solid diluents include among many others: sawdust, vermiculite, clay, talcs, flours, silicas, alkaline earth carbonates, oxides and phosphates, solid fertilizer, and the like. Suitable solvents for liquid formulations include ketones, aromatic and aliphatic hydrocarbons and petroleum fractions or distillates such as xylenes, aromatic naphthas, and the like.

Whether dissolved or dispersed, suspended or emulsified in a liquid or formulated as a dust or powder or some other solid preparation the insecticides of this invention can advantageously contain one or more substances known or referred to variously as modifiers, wetting agents, or surface-active agents. Suitable agents are alkylaryl sulfonates, polyoxyethylene polyol ethers and cators, and the like.

The compounds of the invention can also be formulated in bait compositions, for example with fatty, sugary, or proteinaceous ingestible bait substances.

For controlling pests the compounds of the present invention are applied in insecticidal quantities or effective amounts onto the site of the existing or anticipated harmful pests. Effective insecticidal concentrations are in the range of from about 0.01 pound per acre to about 20 pounds per acre. In most crop applications rates of 0.05 to 5 pounds per acre are employed. Lower rates are used on very susceptible species, while higher rates are used on extremely resistant species. Higher rates than 20 pounds per acre may be used where economics permit.

The rate to be used depends on many variables such as the insect species, duration of control desired, weather, soil type, crop species, timing between application and harvest, economics and other factors known to one of skill in this art. The application of the insecticide can be to the crop itself or to the soil in which it is grown.

While this invention has been described with reference to certain specific embodiments, it will be recognized by those skilled in the art that many variations are possible without departing from the spirit and scope of the invention.

What is claimed is:

1. A compound of the formula

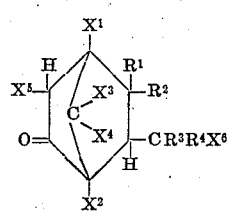

wherein;
 X$^1$ and X$^2$ are independently selected from the group consisting of hydrogen, halogen, lower alkyl and lower alkenyl;
 X$^3$ and X$^4$ are halogen;
 X$^5$ is independently selected from the group consisting of hydrogen and halogen;
 X$^6$ is halogen;
 R$^1$ and R$^2$ are independently selected from the group consisting of hydrogen, lower alkyl, lower alkenyl, monohalo lower alkyl and monohalo lower alkenyl;
 R$^3$ and R$^4$ are independently selected from the group consisting of hydrogen, lower alkyl, monohalo lower alkyl, phenyl, monochlorophenyl, cyclohexyl and monochlorocyclohexyl; and
 R$^1$ and R$_3$ can join to form a cycloalkyl group of 5 to 8 carbon atoms.

2. The compound according to claim 1 having the formula

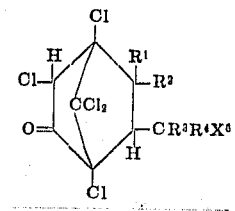

wherein;
 R$^1$ and R$^2$ are independently selected from the group consisting of hydrogen, lower alkyl, lower alkenyl, monohalo lower alkyl, and monohalo lower alkenyl, and
 R$^3$ and R$^4$ are independently selected from the group consisting of hydrogen, lower alkyl, monohalo lower alkyl, phenyl, monochlorophenyl, cyclohexyl, and monochlorocyclohexyl.

3. A compound of the formula

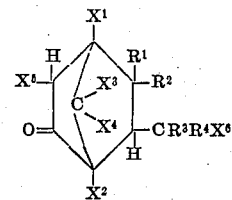

wherein;
 X$^1$ and X$^2$ are independently selected from the group consisting of hydrogen, halogen, lower alkyl and lower alkenyl;
 X$^3$ and X$^4$ are halogen;
 X$^5$ is independently selected from the group consisting of hydrogen and halogen;
 X$^6$ is halogen;
 R$^1$ and R$^2$ are independently selected from the group consisting of hydrogen, chlorine lower alkyl, lower alkenyl, monohalo lower alkyl and monohalo lower alkenyl;
 R$^3$ and R$^4$ are independently selected from the group consisting of hydrogen, lower alkyl, monohalo lower alkyl, cyclohexyl and monochlorocyclohexyl; and
 R$^1$ and R$^3$ can join to form a cycloalkyl group of 5 to 8 carbon atoms.

4. The compound according to claim 3 of the formula

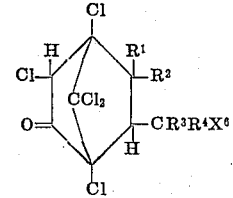

wherein;
 R$^1$ and R$^2$ are independently selected from the group consisting of hydrogen, chlorine lower alkyl, lower alkenyl, monohalo lower alkyl, and monohalo lower alkenyl, and $R^3$ and $R^4$ are independently selected from the group consisting of hydrogen, lower alkyl, monohalo lower alkyl, cyclohexyl, and monochlorocyclohexyl.

5. A compound having the formula:

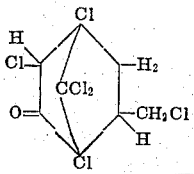

6. A process which comprises reacting at a temperature of from about 100° C to about reflux a phosphorus pentahalide with a compound having the formula:

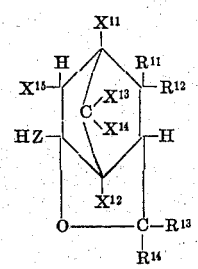

wherein;

$X^{11}$ and $X^{12}$ are independently selected from the group consisting of hydrogen, halogen, lower alkyl and lower alkenyl;

$X^{13}$ and $X^{14}$ are halogen;

$X^{15}$ is independently selected from the group consisting of hydrogen and halogen;

$R^{11}$ and $R^{12}$ are independently selected from the group consisting of hydrogen, chlorine lower alkyl, lower alkenyl, monohalo lower alkyl, and monohalo lower alkenyl;

$R^{13}$ and $R^{14}$ are independently selected from the group consisting of hydrogen, lower alkyl, monohalo lower alkyl, phenyl, monochlorophenyl, cyclohexyl, and monochlorocyclohexyl;

Z is independently selected from the group consisting of oxygen and sulfur;

and then washing with water the reaction product to produce a compound having the formula

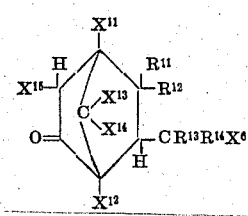

wherein;

$X^{11}$, $X^{12}$, $X^{13}$, $X^{14}$, $X^{15}$, $R^{11}$, $R^{12}$, $R^{13}$, and $R^{14}$ have the meaning recited herein; and $X^6$ is halogen.

7. A process which comprises reacting at a temperature of from about 100° C to about reflux phosphorus pentachloride with a compound having the formula;

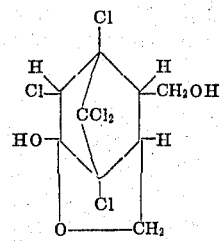

and thereafter washing with water the reaction product to produce the compound having the formula;

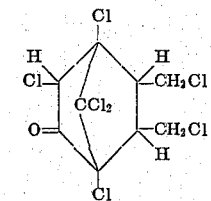

8. A process which comprises reacting at a temperature from about 100° C to about reflux phosphorus pentachloride with a compound having the formula;

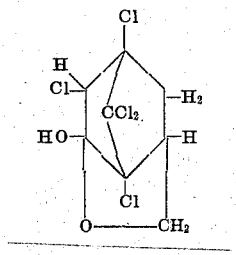

and thereafter washing with water the reaction product to produce the compound having the formula;

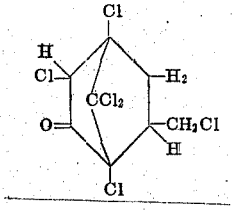

* * * * *

PO-1050
(5/69)

UNITED STATES PATENT OFFICE
CERTIFICATE OF CORRECTION

Patent No. 3,821,307      Dated June 28, 1974

Inventor(s)      Paul E. Hoch

It is certified that error appears in the above-identified patent and that said Letters Patent are hereby corrected as shown below:

In Title Page under "related U.S. Application data" line 2, "1969" should read -- 1968 --; after "3,661,998" insert -- issued May 9, 1972, --. Title page under "ABSTRACT" 3rd line from bottom of Abstract, "yricyclic" should read -- tricyclic --. Column 2, line 2, "chlorodedecyl" should read -- chlorododecyl --; line 31, "chlorocyclohoxyl" should read -- chlorocyclohexyl --; line 35, "elkyl" should read --alkyl --. Column 3, first formula left hand side, that portion of the structural formula reading "CH-CHCl" should read -- CH=CHCl --. Column 5, line 53, "3-hydroxycyclopentene," should read -- 3-hydroxycyclopentene-1, --; line 53, "4,3-hydroxycyclohexene-1," should read -- 3-hydroxycyclohexene-1, --. Column 7, line 60, "cosium" should read -- cesium --. Column 8, line 25, "th" should read -- the --; line 26, "thiocyanaics" should read -- thiocyanates --; line 28, "aside" should read -- azide --. Column 9, line 47, "4-othoxy" should read -- 4-ethoxy --; line 48, "$[4.2.1.0^{4,8}]$" should read -- $[4.2.1.0^{4,8}]$ --. Column 10, line 59, "PENTACHOLORO" should read -- PENTACHLORO --. Column 11, line 5, "broups" should read -- groups --; line 27, "Example" should read -- Elemental --; line 61, "At 50°C.," should read -- At 50 to 55°C, --. Column 12, line 11, "tricycle" should read -- tricyclo --; Columns 11 and 12 Table, "HALIDE" should read -- PHOSPHORUS HALIDE --; heading "PHOSPHORUS PRODUCT" should read -- PRODUCT --. Column 12, last line "metahnol" should read -- methanol --. Column 13, line 18, "insuluble" should read -- insoluble --; line 31, "parJs" should read -- parts --; line 41, "fo" should read -- to --. Column 14, lines 16 and 17, "ompound" should read -- compound --; line 35, "-5,6,6,7,-pentachloro" should read ---5,6,6,7,9-pentachloro --; line 45, "lindene" should read -- lindane --. Column 15, line 16, "cators" should read -- esters --. Column 16, line 3, Claim 1, "$R_3$" should read -- $R^3$ --; line 44, Claim 3, "chlorine lower" should read -- chlorine, lower --; line 66, Claim 4, "chlorine lower" should read -- chlorine, lower --. Column 17, line 36, Claim 6, "chlorine lower" should read -- chlorine, lower --.

Signed and sealed this 4th day of February 1975.

(SEAL)
Attest:

McCOY M. GIBSON JR.      C. MARSHALL DANN
Attesting Officer      Commissioner of Patents